United States Patent [19]
Ellis

[11] 4,099,841
[45] Jul. 11, 1978

[54] HEAD UP DISPLAYS USING OPTICAL COMBINER WITH THREE OR MORE PARTIALLY REFLECTIVE FILMS

[75] Inventor: Stafford Malcolm Ellis, Maidstone, England

[73] Assignee: Elliott Brothers (London) Limited, Chelmsford, England

[21] Appl. No.: 807,920

[22] Filed: Jun. 20, 1977

[30] Foreign Application Priority Data

Jun. 30, 1976 [GB] United Kingdom .............. 27169/76
Feb. 3, 1977 [GB] United Kingdom ................ 4477/77

[51] Int. Cl.² .............................................. G02B 27/14
[52] U.S. Cl. ..................................... 350/173; 350/174
[58] Field of Search ................ 350/173, 174; 356/251, 356/253-255; 353/14; 358/250

[56] References Cited

U.S. PATENT DOCUMENTS

| 3,230,851 | 1/1966 | Reymond | 350/174 |
| 3,778,548 | 12/1973 | Nistri | 350/174 |

*Primary Examiner*—Jon W. Henry
*Attorney, Agent, or Firm*—Kirschstein, Kirschstein, Ottinger & Cobrin

[57] ABSTRACT

A display unit for a vehicle head up display system in which the optical data to be displayed is obtained from a projector having a generally rectangular output aperture and the projected optical data is reflected to an observer by partially light reflective, partially light transmissive films embedded in a body of light transmissive, refractive material through which the observer views the distant real world scene, each film providing the observer with a different field of view of the projected data.

12 Claims, 15 Drawing Figures

HEAD UP DISPLAYS USING OPTICAL COMBINER WITH THREE OR MORE PARTIALLY REFLECTIVE FILMS

This invention relates to display units for head up display systems for use in vehicles, especially aircraft.

Conventionally, such a display unit comprises an optical projector effective to project, collimated, from an output aperture, optical data presented by a source, and an optical combiner comprising partially light transmissive, partially light reflective means so located with respect to said output aperture that, in use, an observer viewing a distant real world scene by transmission of light through said means sees optical data projected through the output aperture, after reflection at said means, as a virtual image superimposed on the distant scene. Such a display unit is hereinafter referred to as a display unit of the kind specified. A virtual image of the output aperture, commonly called the "porthole," appears to an observer using the display unit to be forward of the optical combiner, that is to say between the optical combiner and the distant scene at a position determined by the optical path length between the final lens of the projector and the combiner.

In display units of the kind specified the optical combiner typically comprises a single inclined plate of glass, the external major surfaces of which are optically flat and parallel to one another and the rearwardly facing major surface of which has a partially light-reflective partially light transmissive coating. The coating, since it is exposed, is of the "hard" species. The combiner glass plate is supported with respect to the optical projector, and particularly the output aperture defining part thereof, by side brackets.

If, as in an aircraft, the display unit is subject to quite high acceleration fields and, severe vibration, the combiner plate itself must be rigid and its side support brackets of a substantial nature.

The field of view of the projected optical data available to the observer using such a single plate display unit is, due to practical constraints and considerations, sometimes less than might be desired.

One known method of providing a larger field of view involves the use of an optical combiner which has two inclined glass plates each of which has, as before, optically flat and parallel major surfaces and a partially light-transmissive, partially light-reflective coating on its rearwardly facing major surface. The two plates are supported, by side brackets, in optically parallel planes, one above the other. The dimensions of the two glass plates are such that, observed in the observer's viewing direction to the distant scene, the upper marginal surface of the lower inclined plate and the lower marginal surface of the upper inclined plate overlap to a small extent.

Such an arrangement enables a larger field of view in the vertical direction to be obtained; but the design problems associated with such optical combiners are quite severe. In particular, the side brackets supporting the two plates must be of a very substantial nature if the effects of high accelerations and vibrations on the display unit are to be negligible. Moreover, two-plate combiners are not easy to produce and are not easily maintained in service.

It is an object of the present invention to provide a display unit of the kind specified in which a relatively large field of view may be obtained without the above-mentioned design problems.

According to the present invention in a display unit of the kind specified the output aperture of the optical projector is of generally rectangular shape; and said optical combiner comprises: a body of light-transmissive, refractive material having first and second substantially optically flat parallel external surfaces which face respectively, forwardly, towards the distant real world scene and rearwardly, towards the observer in use of the unit; within said body, at least three partially light-transmissive, partially light-reflective, substantially optically flat, parallel films supported and separated by the material of the body; and a third external surface through which optical data from said projector enters said body for subsequent reflection at said films towards the observer, said third external surface making with said films an angle equal to the angle between the films and said second surface, and said films being relatively positioned so that, observed in the observer's viewing direction to the distant scene, each said film provides a different field of view of the projected optical data.

A display unit in accordance with the invention possesses a number of significant advantages over prior art units, including two-plate combiner display units, previously described.

Thus, with a unit according to the invention relatively large fields of view can be obtained in the presence of a rectangular output aperture of quite modest dimensions.

The optical combiner is of inherently rigid construction.

It is relatively easy to produce and is easily maintained in service.

The refractive property of the transparent material in which said films are disposed contributes significantly to the size of the instantaneous field of view. The location of the 'porthole' of the system, i.e., the virtual image of the output aperture projected in the observer's line of sight through the optical combiner, is, due to the presence of the refractive material, made to appear closer to the observer.

As will be made clear, hereinafter, such an optical combiner may not only have a projector unit of relatively modest dimensions and weight without sacrificing field of view, but, when used in an aircraft, the projector may also be located with an upper portion above the pilot's 'overnose' line to the outside world; the refractive characteristic of the refractive material may be exploited so that the aforesaid upper portion does not intrude into the pilot's forward line of sight to the distant scene.

In a display unit in accordance with the invention there are suitably only three said films. As will be shown, with such a number of films an adequately large instantaneous field of view can be obtained without significant sacrifice of the quality of the display presented to an observer, using the combiner, to view the outside world.

In one particular unit in accordance with the invention the combiner body has a further film on the side of said other films remote from said third surface, which further film is substantially fully reflective. By this means no light entering the combiner body either from the real world or the display is lost. The further film is suitably on an external surface of the combiner body.

As with the prior art optical combiners, the rearwardly and forwardly directed major surfaces of the combiner body preferably have anti-reflective coatings.

There are further advantages arising from the use of display units the subject of the invention:

Since the output aperture of the optical projector is of modest size the opportunity for the entry of sunlight and consequent "white-out" of the display is significantly less than where the display unit has a full circular aperture.

The acceptance angle for the entry of such light is very narrow as commonly is the case with display units of the kind described.

It may be that the vehicle, e.g., the aircraft, in which the display unit is installed, has, forward of the combiner, an optical element e.g., a curved windshield which distorts the real world scene. Whilst it has not been feasible with prior art display units, the present invention offers the possibility for compensating for such distortion by appropriately shaping the forwardly facing surface of the combiner body, e.g., in the case of a windshield, by curving said forwardly facing surface in one or more planes depending on the curvature of the windscreen.

In a unit in accordance with the invention each film will normally extend a major part of the distance between the first and second external surfaces of the combiner. Each film will normally have a reflectivity greater than any film between that film and the output aperture of the optical projector, thereby to tend to produce displays of sensibly uniform brightness.

Several display units in accordance with the invention are hereinafter described, by way of example, with reference to the accompanying drawings in which.

Figure 1:
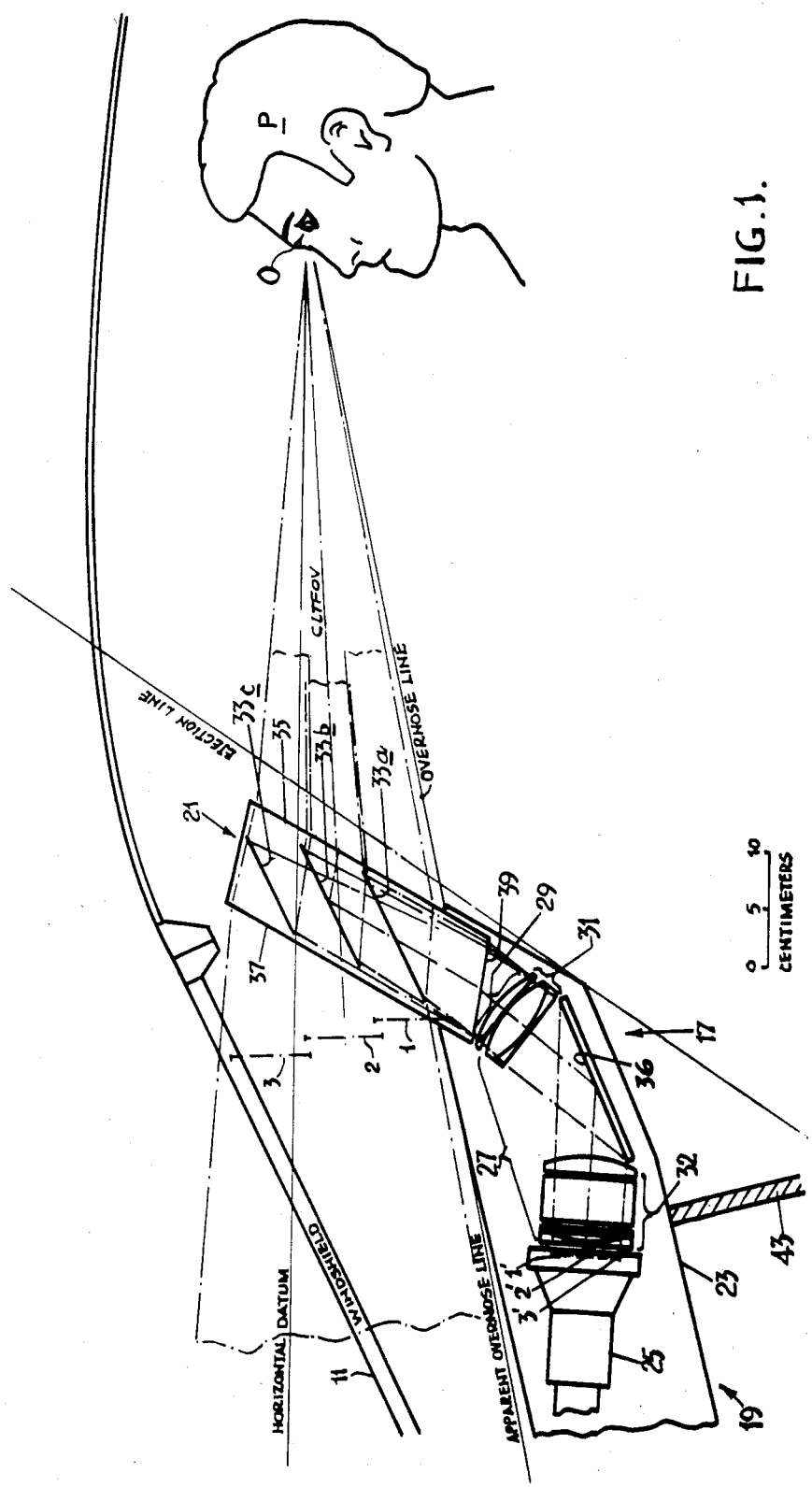
FIG. 1 shows, to the centimetre scale indicated, a side elevation of a first aircraft pilot's display unit.

Referring to FIG. 1, the pilot's display unit 17 comprises an optical projector 19 and an optical combiner 21. A pilot seated in the aircraft cockpit views the scene ahead of the aircraft through the combiner 21 which is mounted between the pilot's head P and the windshield 11 of the cockpit.

The various lines relating the display unit to the aircraft axes are depicted. There is a horizontal datum, an ejection line; and 'overnose' line (defining a depressed limiting sight line for the pilot). The center line of the total field of view of the real world viewed from the operational viewing position O is also indicated by letters CLTFoV.

The optical projector 19 has a housing 23. Within the housing there is a cathode tube 25 and a collimating optical projection system 27. The screen of the cathode ray tube 25 is contained in the focal plane of the optical system 27. Optical data presented at the screen is collimated by the system 27 emerging by way of the output aperture 29 of the final lens 31 of the system 27.

The optical combiner 21 consists of a body of light-transmissive refractive material having three interior optically flat and parallel partially light-transmissive, partially light-reflective thin films 33a, 33b and 33c.

The films 33a, b and c are separated and supported by the material of the combiner body which is a clear plastic material such, for example, as methyl methacrylate. It will be appreciated that other light-transmissive material could also be used, for example, glass.

The rearwardly directed major surface 35 and the forwardly directed major surface 37 of the optical combiner 21 are optically flat and parallel to one another.

The assertion that the faces 35 and 37 are optically flat and parallel is to be understood in the context of the environment in which the display unit is to be used.

Where the windshield 11 is flat the faces 35 and 37 are made flat and parallel as stated. Where, however, the windshield 11 is curved, the forwardly directed face 37 may have a degree of curvature calculated to compensate for the distortion of the real world distant scene which windshield curvature inevitably introduces, albeit of small extent. In practice the curvature which may be given to the forwardly directed surface 37 in order to compensate for windscreen distortion, is very small and the reference to substantially flat and parallel in relation to the surfaces 35 and 37 is to be understood as comprehending such small variations.

Figure 5:
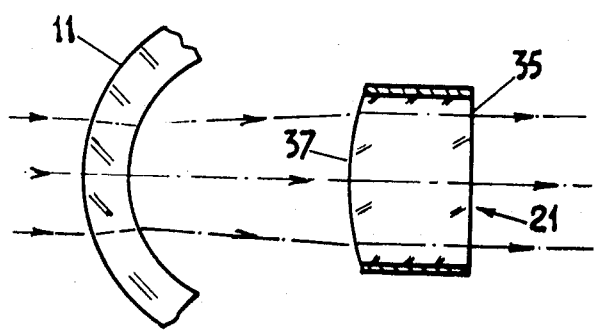
FIG. 5 shows diagrammatically, a method for correcting the optical distortion of the real world distant scene introduced by curvature of a windshield.

The simple principle involved in correcting for windscreen curvature is represented diagrammatically in FIG. 5. The curvatures are, of course, grossly exaggerated in the interests of clarity.

The bottom surface 39 of the optical combiner 21 is located in proximity to the output aperture 29 of the optical projector 19. The bottom surface 39 of the optical combiner 21 makes an angle $\theta$ with respect to the thin films 33a, 33b, and 33c which is equal to the angle between each of the aforesaid films and the rearwardly directed face 35. This angular equality is dictated by the use of a transparent medium, e.g., glass or a clear plastic material, whose reflective index is different from that of air. Unless the above stated angular relationship between the bottom surface 39, the rearwardly directed surface 35, and the several thin films within the transparent material of the optical combiner 21, is preserved, the angle through which a light ray entering the combiner body via the surface 39 is refracted is not equal to the angle through which that light ray is refracted on leaving the combiner body via the surface 35, and the fundamental requirement of head-up displays, that is to say the presentation of collimated images of data presented, e.g., at the screen of a cathode ray tube 25, will not be fulfilled.

Figure 4:
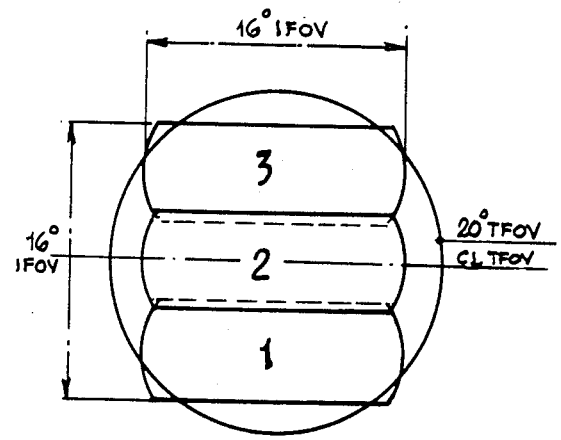
FIG. 4 is a diagram showing the field of view obtainable using the display unit of FIG. 1 or FIG. 3.

The output aperture 29 is of generally rectangular shape. In practice the output aperture 39 is defined in the exit lens 31 which is itself of generally rectangular plan form, the major dimension of the rectangular lens 31 (or aperture 29) being in the direction of width, i.e., the transverse direction, of the body 21, and the minor dimension of the rectangular lens, projected, substantially spanning the bottom surface 39 of the optical combiner 21. Conveniently the rectangular exit lens 31 is produced by cropping or truncating a full circular spherical lens. This is illustrated in FIG. 4 where the general rectangular form of the output aperture is indicated by a dotted line, the minor boundaries of the aperture being curved due to the truncating of the circular final lens 31.

The collimating system 27 of the unit includes not only active elements such as lens combinations 31 and 32 but also a reflecting, intermediate, surface 36. With such an arrangement the optical projector is almost wholly below the "overnose" line 15, and the optical combiner 21 rears upwardly and rearwardly from the optical projector 19 at a relatively steep angle as shown.

Figure 3:
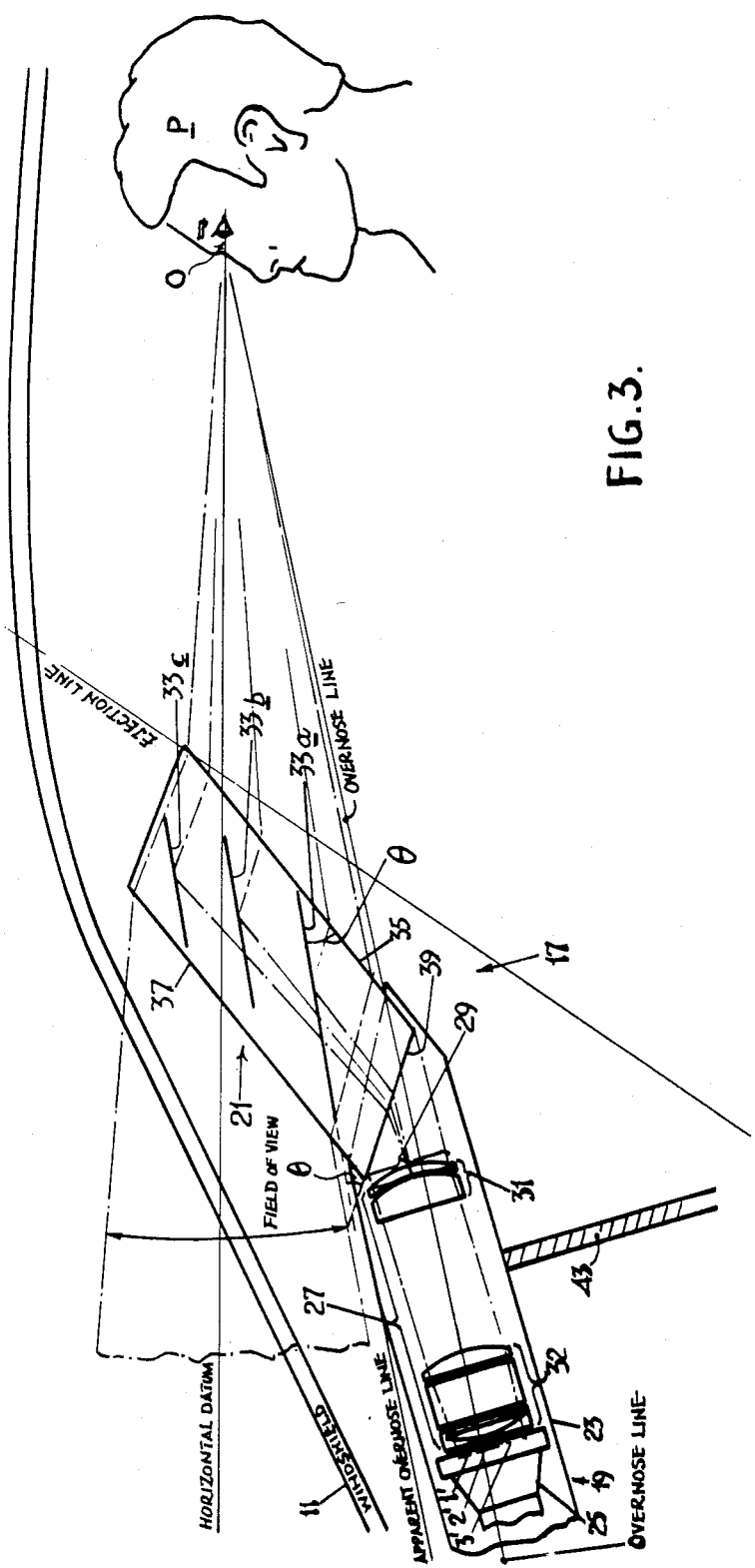
FIG. 3 shows a side elevation of a second aircraft pilot's display unit in accordance with the invention.

FIG. 3 shows a second pilot's display unit in accordance with the invention. In respect of the fields of view obtained and the number of component parts, the units of FIGS. 1 and 3 are virtually identical. Thus the unit of FIG. 3 will not be described in detail and corresponding elements in FIGS. 1 and 3 are given the same reference numeral.

The geometry of the unit of FIG. 3, however, differs considerably from that of the unit of FIG. 1, this arising from the collimating optical system of FIG. 3 being of the "straight-through" type with no element corresponding to the reflecting surface 36 of FIG. 1. As a result, the optical projector 19 of the unit of FIG. 3, while having an output aperture 29 of the same size as in the unit of FIG. 1, makes a much shallower angle with the horizontal datum. Consequently to obtain the same field of view as with the unit of FIG. 1, the combiner 21 of the FIG. 3 unit is appreciably thicker than the combiner in the FIG. 1 unit, and has its forward and rearward major faces at a shallower angle to the center line of the total field of view.

A further geometrical difference between the units of FIGS. 1 and 3 is that in the unit of FIG. 3, a much larger portion of the optical projector 19 extends above the overnose line. However this portion of the projector above the "overnose" line does not constitute an obstruction in the pilot's view of the distance real world scene. That this is the case arises from the use of a high refractive index transparent medium for the combiner 21. As may be gathered, whereas rays from the distant scene along the "overnose" line are intercepted by the housing of the optical projector and hence, are not received by the pilot, parallel rays, i.e., other rays from the same "distant" point are incident on the optical combiner and, after refraction, are received by the pilot. Since the parallel sided optical combiner preserves real world angles, the otherwise obscured, distant point is visible through the combiner 21. Thus the display unit has the effect of producing an "apparent overnose" line so that there is no loss of vision due to the position of the optical projector. It will be appreciated that this effect is also present in the unit of FIG. 1, to a much lesser extent.

A disadvantage of the unit of FIG. 3 is that the greater bulk of the optical combiner 21 implies a greater weight, and this disadvantage must be set off against the desirability of raising the unit so as to encroach as little as possible on space available for the instrument panel 43.

The instantaneous and total fields of view (IFoV and TFoV) of the projected optical data obtained with the units are illustrated in FIG. 1 and FIG. 4. Thus, the three films 33a, b and c effectively give rise to three different, overlapping instantaneous fields of view 1, 2 and 3 which respectively correspond to segments 1', 2' and 3' of the screen of the cathode ray tube 25. The paths of various rays of light, in particular those defining the limits of the pilot's fields of views through the combiner of the projected data and real world, are indicated by chain dotted lines in the Figures. It will be appreciated that in other arrangements the different fields of view attributable to the different films may not overlap, but may just touch edge-to-edge. However, there will normally be no gaps between the different fields of view.

The relatively large instantaneous fields of view despite the modest dimensions of the output aperture 29 are obtained as a result of refraction in the optical combiner 21, the "porthole" to observer's eye position 'O' being shorter than would be the case if no such refraction took place i.e., the combiner consisted of a material having the same refractive index as air.

Figure 2:
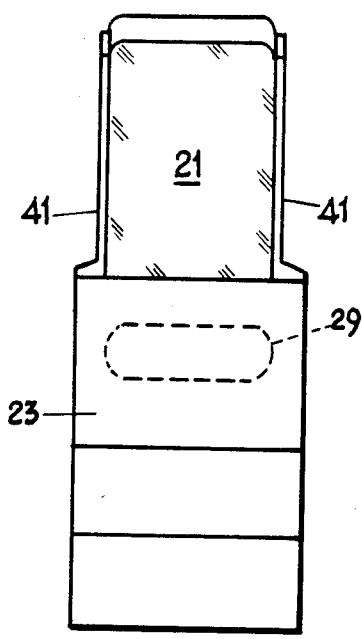
FIG. 2 shows a rear elevation of the display unit of FIG. 1.

As illustrated in FIG. 2, the optical combiners 21 of the units of FIG. 1 and FIG. 3 are supported by simple side mounts 41.

Figure 6:
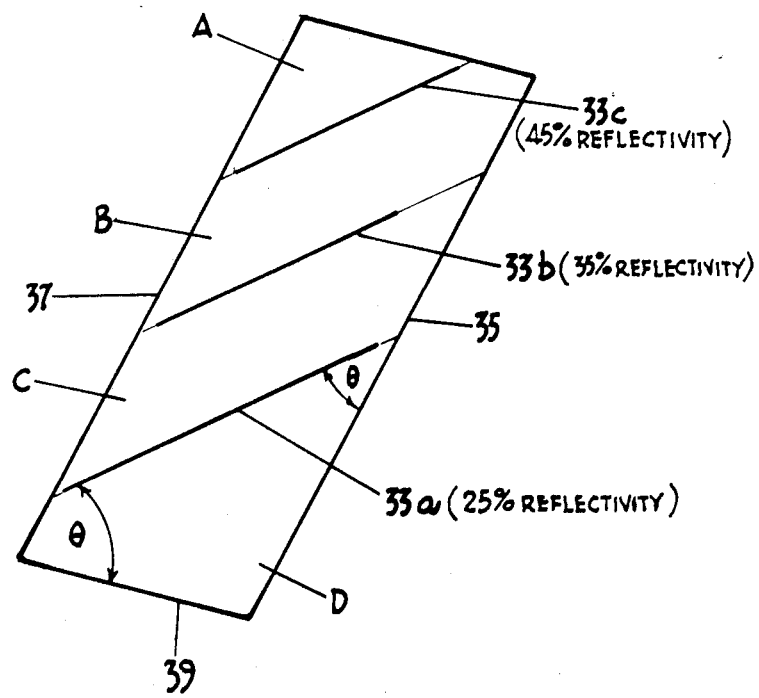
FIG. 6 is a sectional view showing the construction of the optical combiner of the unit of FIG. 1.

The optical combiners 21 can be fabricated using standard optical techniques. Thus, referring to FIG. 6, each combiner 21 is suitably fabricated by first producing four prisms A, B, C and D which are ground and polished to form surfaces on which films 33a, 33b and 33c may be deposited, the prisms then being bonded together using a suitable optical cement. The resulting block of light transmissive material is then ground and polished so as to form the optically flat and parallel forwardly and rearwardly directed principle surfaces 35 and 37. Finally, the latter two surfaces are given an anti-reflection coating. The films 33a, 33b, 33c being protected, may be "soft" coatings.

In practice the films 33a, 33b and 33c typically have reflectivities of 25%, 35% and 45%, respectively. With such reflectivities both the display and the distant scene viewed through the combiner are of approximately uniform brightness, but in common with conventional display units, the distant scene viewed through the combiner appears somewhat darker than the same scene viewed normally.

In the embodiments described above with reference to FIGS. 1 to 6 light from the display and from the distant scene is transmitted or reflected, as the case may be, upwardly through or by the interior film 33c and escapes through (or is absorbed at) the upper surface of the combiner 21.

Figure 7:
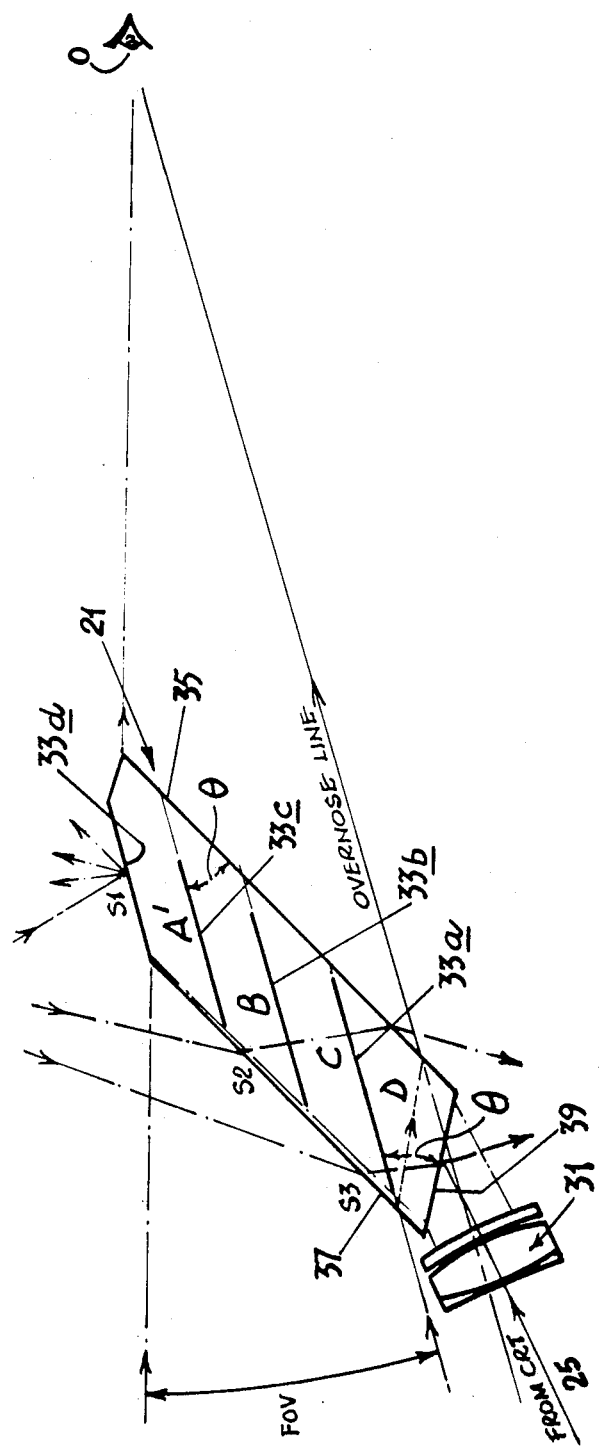
FIG. 7 shows, diagrammatically, a sectional view through a further form of optical combiner for use in a display unit in accordance with the invention.

In other embodiments, as illustrated in FIG. 7, the combiner 21 has, in addition to the interior films 33a, 33b and 33c, an exterior reflective film 33d optically flat and parallel to the interior films, which gives rise to a further field of view of the projected data. Whereas the interior films are partially reflective the film 33d is substantially fully reflective.

To achieve parallelism between the reflective coating 33d and the interior coatings of the combiner an element A' is employed at the upper end of the combiner. The upper surface of the element A' carries the exterior reflective coating 33d.

In the combiner illustrated in FIG. 7 substantially none of the light, either from the distant scene or from the display is lost; the final fully reflective coating 33d deflecting such light as is transmitted or reflected upwardly through or by the film 33c to the observer.

Given that, viewed using the combiner, the distant scene and the display must have a sensibly constant brightness across the field of view and be, at the same time, in adequate contrast, it will be apparent that the use of an exterior final fully reflective coating 33d dictates that the choice of transmissivities and reflectivities of the several interior coatings must be carefully calculated.

It should be noted that some of the light from the real world distant scene is transmitted by the coatings 33a, 33b and 33c and some is reflected upwardly. The contributions, both transmitted and reflected, of the several coatings must be taken into account in achieving the desired end i.e. uniformity of brightness in real world and display.

Figure 8:
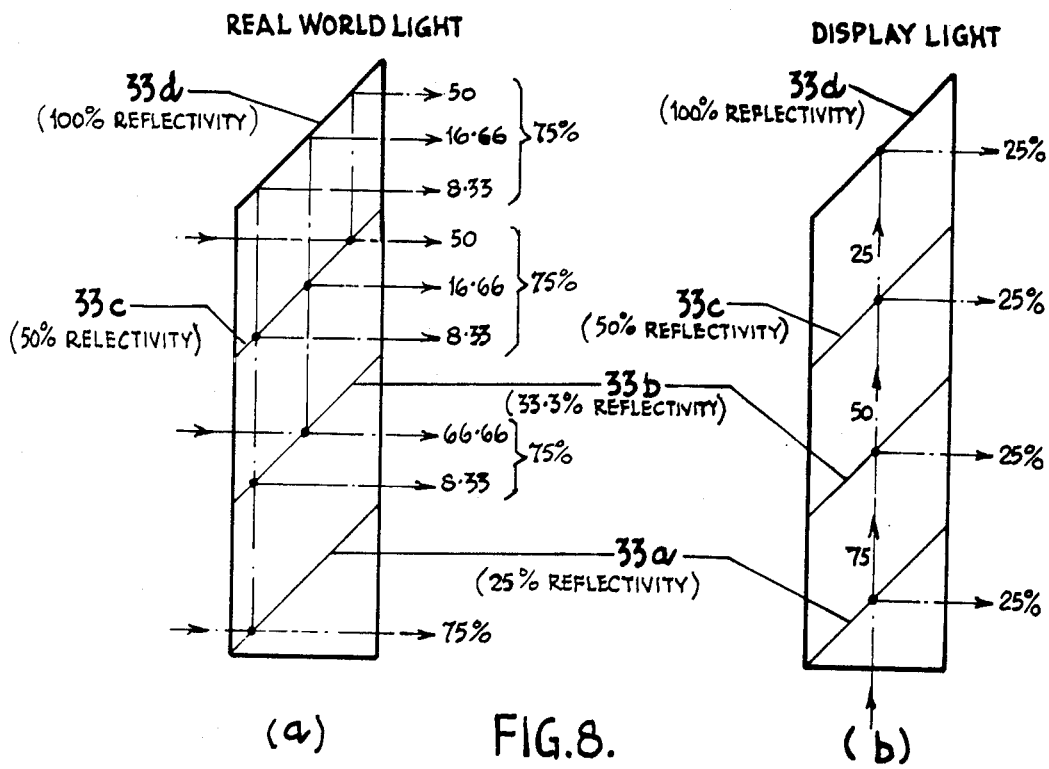
FIG. 8 is a diagram illustrating the effect of various light-reflective and light-transmissive films in the combiner of FIG. 7.

In theory, given that a 75% real world uniform brightness and a 25% display uniform brightness is the design aim then, as shown diagrammatically in FIG. 8a and 8b, this may be achieved with reflectivities of the coatings 33a, 33b, 33c and 33d in the proportions 0.25: 0.33: 0.50: 1.00 respectively, that is transmissivities in the proportions 0.75: 0.66: 0.50: 0.

In practice, of course, perfect uniformity cannot be achieved due to transmission loss in, and polarization by the films. This means that in practice uniformity can be obtained either for real world light or display light, but not for both. It is considered that where uniformity must to some extent be sacrificed, variation in uniformity in apparent display brightness is more likely to be acceptable than variation in apparent real world brightness; and the transmissivities and reflectivities may be chosen accordingly.

It should also be noted that if greater contrast between apparent real world and apparent display is required, this can be achieved by introducing one or more additional interior optically flat and parallel, light transmissive light reflecting films. The introduction of any such film or films will necessarily dictate a change in each of the other interior films present.

Finally, it will be seen that rays, e.g., from the sun have little opportunity for reaching the observer after reflection. Thus referring to FIG. 7, rays incident on the combiner at position S1 are reflected diffused from the combiner and rays incident at position S2 or S3 are refracted by the combiner.

Figure 9:
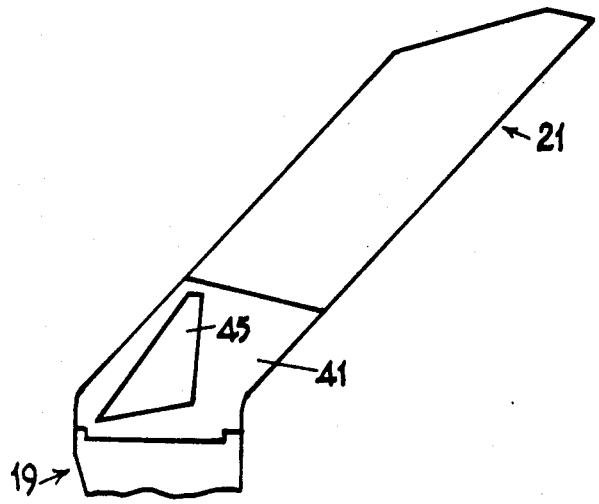
FIG. 9 illustrates diagrammatically a third aircraft pilot's display unit in accordance with the invention.

In the arrangements of FIGS. 1 to 7 the output aperture 29 is selected in close proximity to the optical combiner. While this is desirable from the point of view of making the "porthole" to observer's eye position separation small, it is not necessarily the case in an arrangement in accordance with the invention. For example, in order to use an optical combiner of the kind provided by the present invention in an existing conventional pilot's display unit, so as to convert the unit to the form provided by the present invention, it may be necessary to space the combiner somewhat from the output aperture of the optical projector, and to redirect the light emergent from the output aperture by suitable reflecting means such as a prism. One such arrangement is illustrated in FIG. 9, the prism 45 serving to redirect the light from the optical projector 19 into the optical combiner 21.

The design of an optical combiner for use in a display unit in accordance with the invention, may be carried out by manual drawing. However, instead of using manual drawing a computer program may be devised to assist in design, the program being arranged to follow along the lines of the following algorithm, which is applicable to an optical combiner of the kind described above with reference to FIG. 7.

Figure 10:
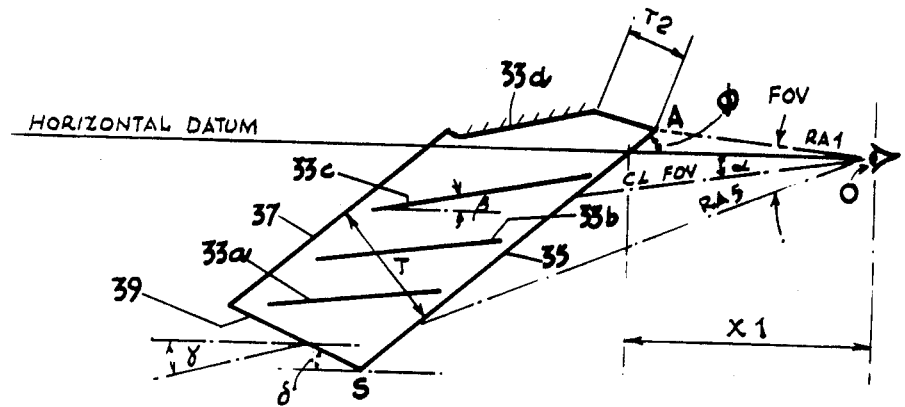
FIGS. 10 to 15 are diagrams illustrating a procedure for designing an optical combiner for use in a display unit in accordance with the invention.

Firstly, values for the following quantities are decided upon, the quantities concerned being indicated on FIG. 10.

X1 — Distance from observer's eye to face 35 along horizontal datum
FoV — Observer's total field of view of display
$\alpha$ — Angle of center line of field of view with horizontal
$\gamma$ — Angle of center line of projected display entering face 39 to horizontal.
$\phi$ — Angle of face 35 with horizontal
AS — Length of face 35
T2 — Length between face 35 and film 33d of top ray from observer's eye From these values, the value of the following quantities may be obtained Angle of films 33 to horizontal $(\beta) = \frac{1}{2}(\alpha - \gamma)$
Angle of top ray to horizontal $(RA1) = \alpha + \frac{1}{2}$ FoV
Angle of face 39 to horizontal $(\delta) = \phi - 2\beta$ Also, the following relationship exists:

$$\gamma = \phi - 2\beta$$

Figure 11:
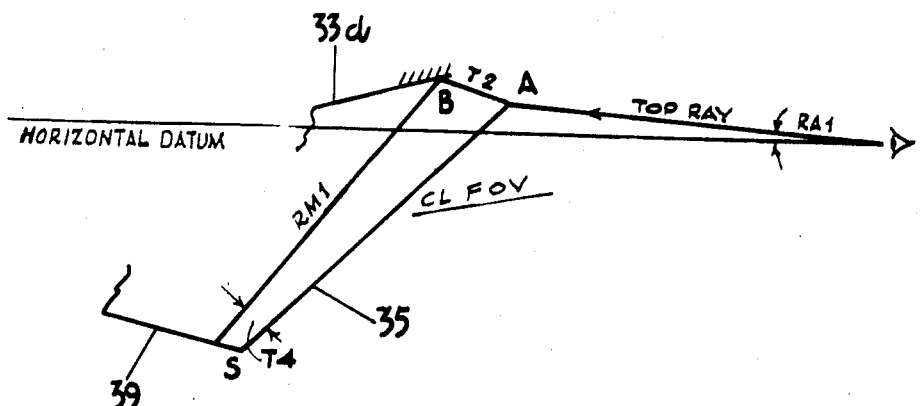

At this stage the combiner is defined to the extent illustrated in FIG. 11, line RM1 being the path of the top ray in the combiner after reflection at film 33d, and T4 being the distance between the ray RM1 and the face 35 at the face 39.

The quantity T4 is then tested to ensure it is a suitable distance inside the combiner; if it is not the value of T2 is increased in small steps until T4 is a suitable distance inside the combiner.

Figure 12:
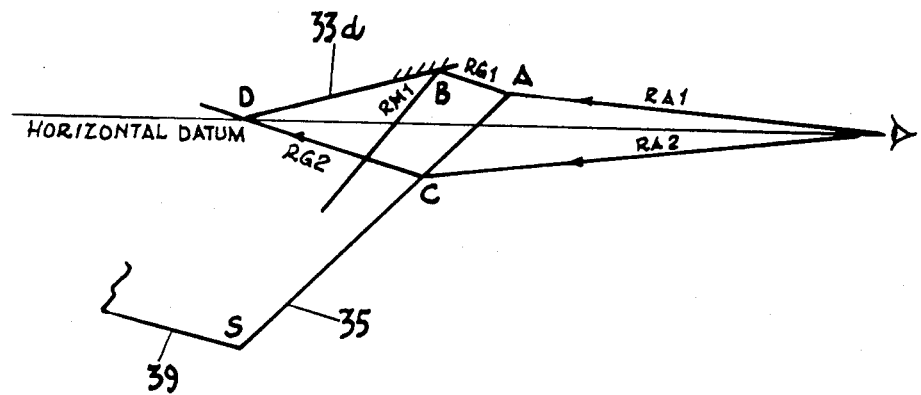

An angle is now chosen for the bottom ray RA2 reflected by film 33d, the combiner then being defined to the extent illustrated in FIG. 12. When ray RA2 has entered the combiner its path after diffraction is RG2, meeting film 33d at point D which defines the lower end of film 33d.

Figure 13:
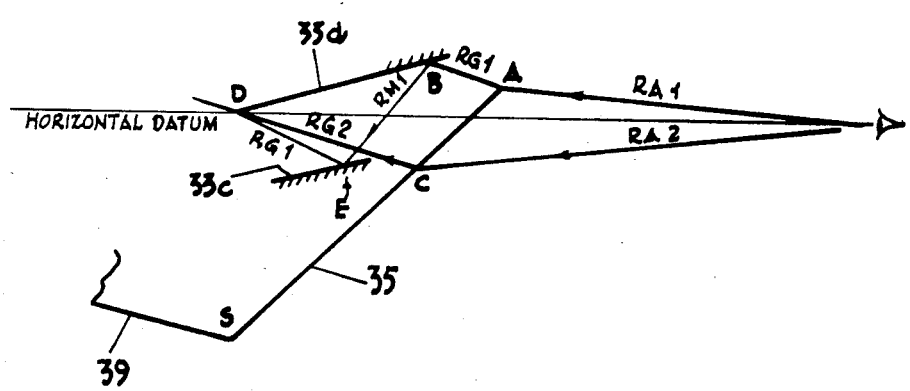

The top film 33d has now been fully defined, and the film 33c can be located. When ray RA1 has entered the combiner its path after diffraction is RG1 meeting film 33d at point B; likewise its path after reflection from film 33d is RM1. A point E on film 33c where RM1 is reflected to pass through point D can therefore be located, as illustrated in FIG. 13.

Figure 14:
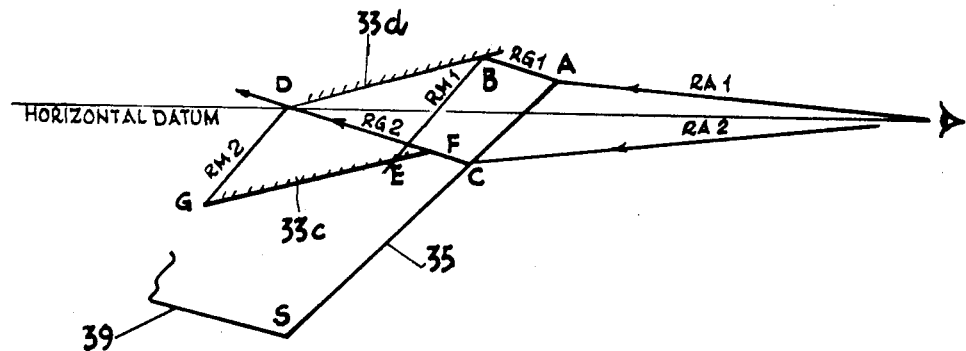

All the films 33 are parallel to each other, and the film 33c can therefore now be drawn through point E, the film 33c extending upwards until it meets at F the path RG2 followed by ray RA2 after diffraction on entering the combiner and downwards until it meets at G the path RM2 followed by ray RA2 after reflection at film 33d. The combiner is thus now defined to the extent illustrated in FIG. 14.

The bottom ray RA3 incident on film 33c must pass through point G after refraction along path RG3 and can be found by an iterative process.

Figure 15:
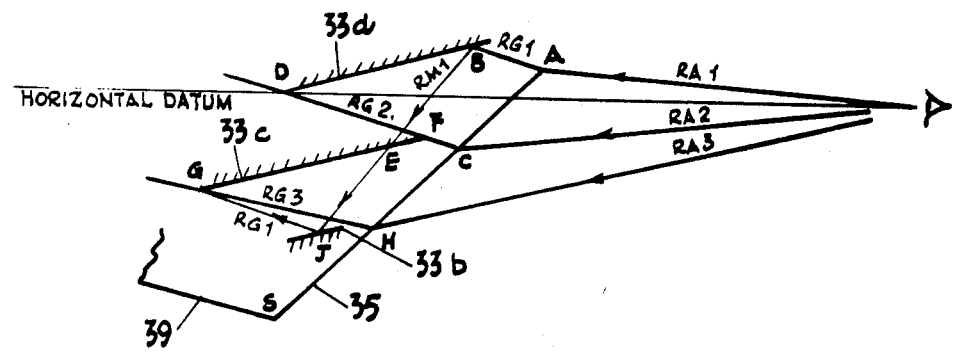

The process used to find point E is repeated to find a point J on the film 33b where a ray on path RM1 is reflected to pass through point G, as illustrated in FIG. 15. Film 33b extends upwards to path RG3 and downwards to path RM2 and is therefore now fully defined.

The process continues until the remaining film 33a and the lower principal ray RA5 are defined. It is not until now that FoV is found by subtracting RA5 from RA1. If this is less than the required FoV the process reverts to the point where RA2 was chosen, and further iterations are carried out with RA2 declined by a small amount until the desired FoV has been achieved.

The values obtained are then tested to determine whether any of the lower three films protrudes through the rear surface of the combiner; if it does, the value of T2 is increased by a small amount and the whole process is repeated.

It is now necessary to ascertain the position of the front face 37 of the combiner. Its position is defined as the minimum combiner thickness T (see FIG. 10) compatible with enclosing the most forward ends of all four films, and enclosing the rays from these determined points by a suitable amount sufficient to ensure that no films meet the outside surfaces of the combiner.

Finally, all the exit rays and center-line rays can be determined.

It will be appreciated that whilst in the embodiments described above, by way of example, only three partially light reflective, partially light transmissive films are used, more than three such films can be used in other embodiments of the invention. However, in the interest of simplicity, the number of such films will normally be kept to the minimum possible consistent with obtaining an adequately large field of view of the projected data and a good quality view of the real world through the combiner.

I claim:

1. A display unit for a head up display system for use in a vehicle comprising:
    an optical projector which projects, collimated, from an output aperture, optical data presented by a source; and
    an optical combiner comprising partially light transmissive, partially light reflective means so located with respect to said output aperture that, in use, an observer viewing a distant real world scene by transmission of light through said means sees optical data projected through the output aperture, after reflection at said means, as a virtual image superimposed on the distant scene
    and including the improvement that the output aperture of the optical projector is of generally rectangular shape and said optical combiner comprises: a body of light-transmissive, refractive material having first and second substantially optically flat parallel external surfaces which face respectively, forwardly, towards the distant real world scene and rearwardly, towards the observer, in use of the unit; within said body, at least three substantially optically flat and parallel films supported and separated by the material of the body and effective to reflect light incident thereon from the optical projector and to transmit light incident thereon from the real world; and a third external surface through which optical data from said projector enters said body for subsequent reflection at said films towards the observer, said third external surface making with said films an angle equal to the angle between the films and said second surface, and said films being relatively positioned so that, observed in the observer's viewing direction to the distant scene, each said film provides a different field of view of the projected optical data.

2. A display unit according to claim 1 wherein there are only three said films.

3. A display unit according to claim 1 including a further film on the side of said other films remote from said third surface, which further film is substantially fully reflective.

4. A display unit according to claim 3 wherein said further film is on an external surface of the combiner body.

5. A display unit according to claim 1 wherein said combiner body consists of a plastics material.

6. A display unit according to claim 5 wherein said plastics material is methyl methacrylate.

7. A display unit according to claim 1 wherein said combiner body comprises a plurality of prisms bonded together, each said partially reflective, partially transmissive film being constituted by a coating sandwiched between an adjacent pair of said prisms.

8. A display unit according to claim 1 wherein said third external surface constitutes a lower surface of the combiner body in use of the unit.

9. A display unit according to claim 1 wherein each said film extends over a major part of the distance between said first and second external surfaces.

10. A display unit according to claim 1 wherein said first external surface is shaped so as to compensate for distortion of the real world scene effected by an optical element situated forward of said combiner.

11. A display unit according to claim 1 wherein each film has a reflectivity not less than any said film between that film and said output aperture.

12. A display unit according to claim 1 wherein refraction by the combiner body of light rays from the distant scene enables the observer to view through the combiner body a part of the distant scene which would otherwise be obscured by a part of the display unit forward of the combiner body.

* * * * *